April 26, 1932. H. CAVE 1,856,026
FEED APPARATUS
Filed Feb. 16, 1926 2 Sheets-Sheet 1
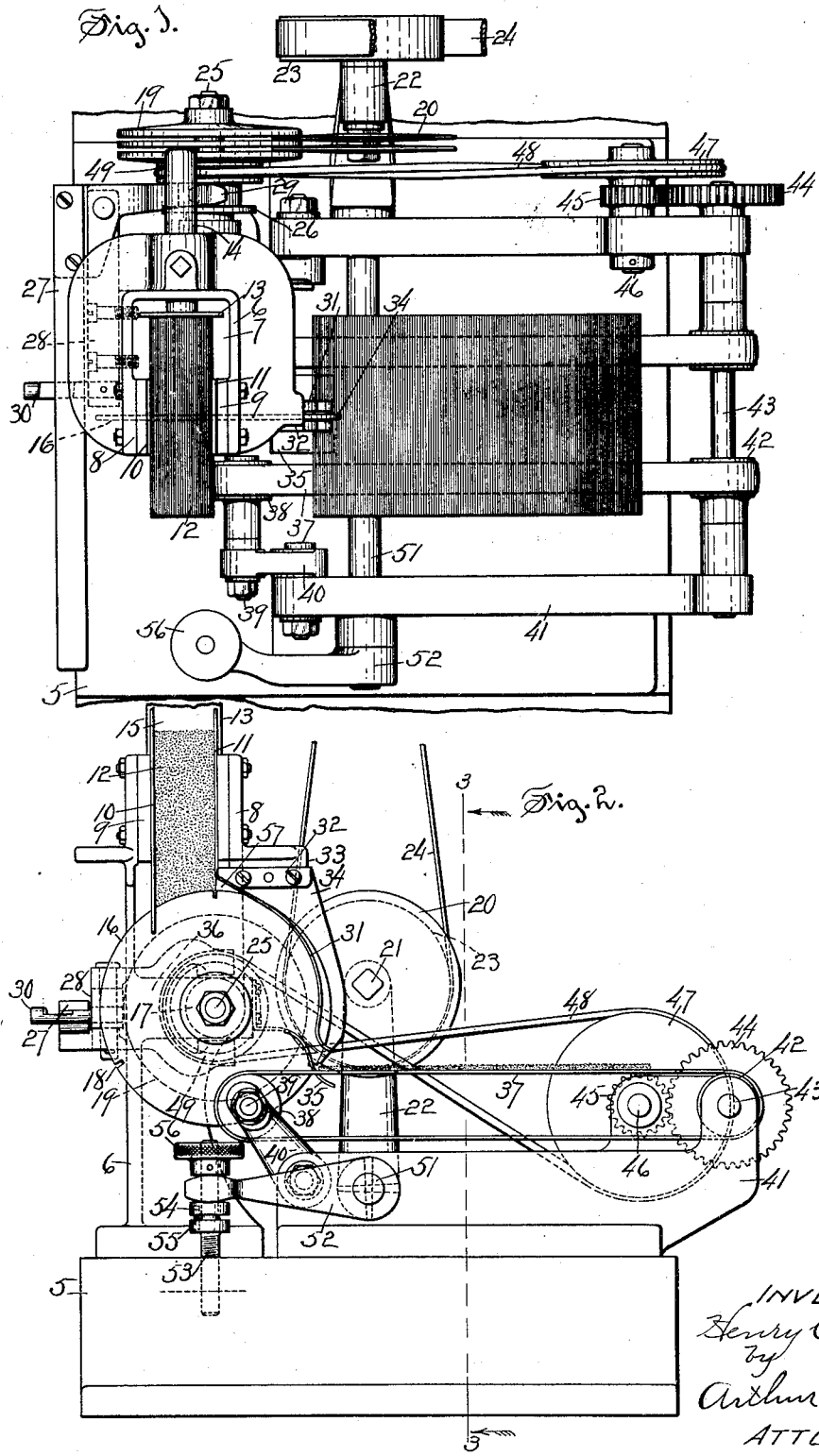

April 26, 1932. H. CAVE 1,856,026

FEED APPARATUS

Filed Feb. 16, 1926 2 Sheets-Sheet 2

INVENTOR
Henry Cave.
by
Arthur B. Jenkins
ATTORNEY

Patented Apr. 26, 1932

1,856,026

UNITED STATES PATENT OFFICE

HENRY CAVE, OF HARTFORD, CONNECTICUT, ASSIGNOR TO THE FULLER BRUSH COMPANY, OF HARTFORD, CONNECTICUT, A CORPORATION OF CONNECTICUT

FEED APPARATUS

Application filed February 16, 1926. Serial No. 88,711.

My invention relates more especially to that class of feed devices that are applicable to machines employed in the making of brushes, and an object of my invention, among others, is the production of a feed apparatus or device that shall be reliable as well as rapid in operation, and particularly efficient as to the character of work performed by it.

One form of feed apparatus embodying my invention and in the construction and use of which the objects herein set out, as well as others, may be attained, is illustrated in the accompanying drawings, in which—

Figure 1 is a plan view of a machine embodying my invention.

Figure 2 is a view in side elevation of the same.

Figure 3:
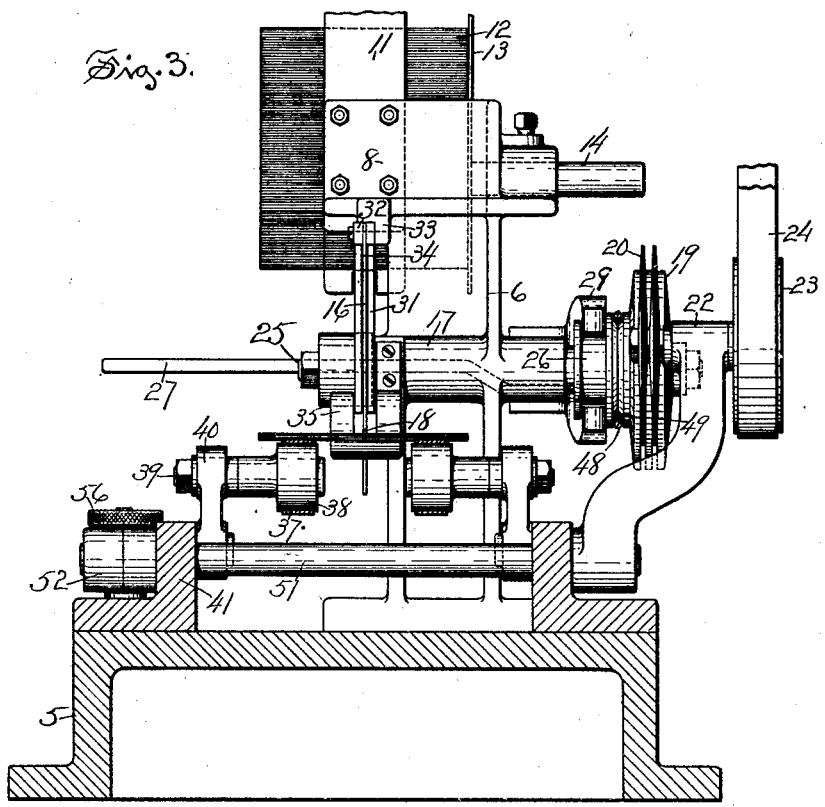
Figure 3 is a view in section on a plane denoted by the dotted line 3—3 of Figure 2.

In the accompanying drawings the numeral 5 denotes the bed of my improved feed apparatus that may be of any desired form and composed of any suitable material, with a column 6 rising therefrom and having an opening 7 at its upper end bounded by fixed jaws 8, including filling pieces 9. Fiber supporting plates 10 and 11 are secured to said jaws and rise therefrom, preferably in parallel relation, to support a mass of fibres 12 along the sides thereof, an end supporting plate 13 extending from within said opening 7 and upwardly to support said mass at the ends of the fibers, said plate 13 being attached to the end of a supporting rod 14 secured in a hole in the column 6 at the back of the jaws 8, said supporting plates 10, 11 and 13 comprising a hopper or chute 15 within which the fibers are deposited, as shown in Figures 1 and 2 of the drawings.

A feed disc or collector 16 is secured to a shaft rotatably mounted in a bearing 17 formed on the column 6, said disc being rotated in a manner to be hereinafter described. The axis of this disc is located at one side of a line extending through the longitudinal center of the hopper or chute 15 so that the bottom of the mass of fibers is inclined downwardly in a direction opposite to the direction of rotation of said disc, and said disc therefore travels upwardly into the mass in its rotation. Collecting notches 18 are formed in the periphery of the disc, these notches being comparatively shallow and they may consist of any suitable number, three being shown herein, the number of notches depending upon the conditions of operation as to the speed of the disc, etc., and especially upon the length of the fibers, it being essential that the fibers in one notch shall be separated from the mass before the next notch begins to receive fibers. In such separation the fibers bend back and the distance between the notches is, therefore, slightly more than one-half the length of the fibers.

The disc is driven by a connection that permits it to be rotated at variable speeds, this connection comprising a series of driven discs 19 secured to the shaft 25 that supports the feed disc, said discs 19 being spaced to receive the edges of driving discs 20 between them, said driving discs being secured to a driving shaft 21 mounted in a bearing on a supporting arm 22, the said shaft having a driving pulley 23 driven as by means of a belt 24. The driving connection comprising the discs 19 and 20 is of old and well known construction, the discs 19 being loosely mounted for lengthwise movement only on the shaft 25 to which the feed disc 16 is secured, said discs 19 being forced toward each other by means of a spring (not shown) in a grooved collar 26 splined to the shaft 25. A stopping and starting lever 27 is pivotally supported by a bar 28 secured to the column 6, the handle comprising a part of the lever extending along side the bar to an accessible position, and as shown in Figure 1 of the drawings, the forked end 29 being located in a groove in the collar 26, and by means of which fork the discs are shifted against the tension of the spring to loosen the discs and stop operation of the machine. A retaining pin 30 projects from the bar 28 and has a notch to receive the handle of the lever 27 and retain said lever in a position to prevent operation of the machine.

Resilient guards 31 are secured at their upper ends to a cleat 32, which cleat is secured, as by means of screws, to a projection 33 from one of the jaws, 8, and as shown in Figure 1, said cleat also securing a fiber retainer 34 in place. The guards 31 are secured to a beveled surface on the under side of the projection and they are of such resiliency that they will swing outwardly under the force applied by the fibers as the latter are carried along by the disc 16. The retainer 34 rests against the edge of the disc 16 to prevent the fibers from rising out of the notches 18, and it has a heel 57 that acts as a strike to prevent the notches 18 from being overfilled.

Guides 35 are secured at their upper ends to a fillet in which the bearing 17 is formed, these guides being located on opposite sides and close to the disc 16, and they operate to remove the fibers from the notches 18 and to guide them on to carrier belts 37 on which they are deposited in a flat layer, and from which belts they may be removed in any desired manner, either mechanically or manually, an object of this device being to collect the fibers from the hopper and deposit them in a flat layer for such subsequent use as may be desired, these guides being ejectors as well as guides.

The belts 37 are supported at one end on pulleys 38 mounted on stud shafts secured to arms 40 adjustably pivotally mounted in carrier supports 41 secured to and projecting upwardly from the bed 5, said arms being rigidly secured as by means of nuts to fix the position of the stud shafts 39 and thereby preserve a proper tension of the carrier belt. The opposite ends of the carrier belts are supported on pulleys 42 secured to a carrier driving shaft 43 mounted in bearings in the ends of the supports 41, said shaft being driven as by means of a gear 44 secured thereto and meshing with a pinion 45 rotatably mounted on a stud shaft 46 secured to and projecting from one of the supports 41, said pinion having a sheave 47 rigidly connected therewith to receive a belt 48 extending over a sheave 49 secured to the feed disc shaft 25.

The arm 22 is secured to a rock shaft 51 mounted in bearings in the supports 41, the opposite end of this shaft having an adjusting arm 52 secured thereto and engaged by an adjusting screw 53 screwed into the bed 5. A collar 54 is loosely mounted on the adjusting screw and is thrust, as by a spring 55, against the end of the arm 52 to force the latter against the head 56 of the screw, said head being employed as a means for turning the screw, and said spring being seated between said collar and said head as shown in Figure 2 of the drawings.

Wherever the term "fibers" is employed herein to denote the mass of material within the hopper, I intend to be included within said term all material of whatsoever kind that may be employed in the making of brushes, such as bristles, threads, or raw or prepared vegetable fibers, or any other brush material whatsoever.

My improved feed apparatus is not to be considered as limited in its use with any particular type of mechanism, but as it has been employed in connection with brush making machinery of the kind shown in my copending application filed December 14, 1925, of Serial Number 75,219, mention is made of that fact, the present mechanism having been designed as an improvement upon the apparatus shown in said application.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A receptacle having an opening for the delivery of fibers therefrom, a fiber collector rotatably mounted for uninterrupted rotation in one direction only adjacent to said opening in position to receive fibers delivered therefrom, said collector having an open collecting notch therein in which said fibers are received and carried away from the receptacle, and means for rotating said collector.

2. A receptacle having an opening for the delivery of fibers therefrom, a fiber collector located adjacent to said opening in position to receive fibers delivered therefrom, said collector having a collecting notch therein in which said fibers are received and carried away from the receptacle, said collector being rotatably movable with respect to the receptacle uninterruptedly in one direction only and arranged with its axis of rotation to one side of the vertical axis of the receptacle to cause movement of said collecting opening across but diagonally into the mass in a direction opposite to the direction of movement of said mass toward said delivery opening, and means for effecting said relative movement.

3. A receptacle having an opening for the delivery of fibers therefrom, a fiber collector located adjacent to said opening in position to receive fibers delivered therefrom, said collector having a collecting notch therein in which said fibers are received and carried away from the receptacle, said collector being rotatable and positioned with its axis of rotation to one side of the vertical axis of the receptacle to effect movement of said collecting notch in one direction only obliquely across said opening, and means for operating said collector.

4. A receptacle having an opening for the delivery of fibers therefrom, a fiber collector rotatably mounted for movement continuously forward and located in position to receive fibers delivered from said opening, said collector having a curved edge with a collecting opening therein in which said fibers are received and carried away from the receptacle, said collector being located with its edge projecting upwardly into a mass of fibers in the receptacle in the direction of movement of said edge, and means for rotating said collector.

5. A receptacle having an opening for the delivery of fibers therefrom, a fiber collector located adjacent to said opening in position to receive fibers delivered therefrom, said collector having a collecting opening therein in which said fibers are received and carried away from the receptacle, said collector being relatively movable with respect to the receptacle, uninterruptedly in one direction only, means for effecting said relative movement, said collector including fiber holding means of proper size compared with the width of the receptacle to remove a section of uniform thickness from the full width of the base of the material within the receptacle.

6. A receptacle vertically arranged and having a delivery opening in the bottom thereof, a circular disc rotatably mounted for continuous forward movement underneath said opening and having a collecting notch therein, said disc rotating in a plane passing through the vertical axis of the receptacle and having its axis of rotation toward one side of said receptacle axis to cause said notch to travel obliquely upward into a mass of fibers in said receptacle, and means for rotating said disc to effect removal of fibers from said receptacle.

7. A receptacle having an opening for the delivery of fibers therefrom, a fiber collecting disc positioned to receive fibers delivered from said opening and having a collecting opening therein in which said fibers are received and carried away from said receptacle, means for rotating said disc constantly in a forward direction, and means for preventing overfilling of and undesired removal of fibers from said collector opening.

8. A receptacle having an opening for the delivery of fibers therefrom, a fiber collecting disc rotatably mounted and having a plurality of collecting openings spaced apart a distance not less than one-half the length of fibers to be collected, and means for uninterruptedly rotating said disc.

9. A receptacle having an opening for the delivery of fibers therefrom, a fiber collecting disc rotatably mounted and having a collecting notch in its edge, an immovable guide extending across the path of the fibers in said notch to force said fibers from said notch by the movement of said disc, means for rotating said disc, and means located at one side of said guide to receive fibers from said notch.

10. A receptacle having an opening for the delivery of fibers therefrom, a fiber collecting disc rotatably mounted beneath said receptacle and having a collecting notch in its edge, an inclined guide positioned at the side of the disc to underlie the fibers in said notch and to eject them from said notch during rotation of said disc, means for rotating said disc, and means to receive fibers from said notch.

11. A receptacle having an opening for the delivery of fibers therefrom, a fiber collecting disc rotatably mounted and having a collecting notch in its edge, a fiber retainer extending along the edge of said disc and positioned to oppose movement of fibers out of said notch, means for rotating said disc in one direction only, and stationary means for removing fibers from the collecting notch.

12. A receptacle having an opening for the delivery of fibers therefrom, a fiber collecting disc rotatably mounted and having a collecting notch in its periphery, guards located on opposite sides of the disc with their inner edges inside of the periphery of the disc to press the fibers into said notch, means for rotating said disc, and stationary means for removing fibers from the collecting notch.

13. A receptacle having an opening for the delivery of fibers therefrom, a fiber collecting disc rotatably mounted and having a collecting notch in its periphery, resilient guards located on opposite sides of the disc with their inner edges inside of the periphery of the disc to press the fibers into said notch, means for removing fibers from the collecting notch, means for moving the fibers away from the disc in a continuous flat layer, and common means for driving said disc and last mentioned means in proper relative timed relation.

14. In combination, a vertically extending fiber receptacle, conveyor means below said receptacle for moving horizontally a flat layer of fibers, and means for transferring the fibers from the receptacle to the conveyor means.

15. In combination, a vertically extending fiber receptacle, conveyor means below said receptacle for moving horizontally a flat layer of fibers, means for transferring the fibers from the receptacle to the conveyor means, said transfer means including a notched rotatable disc positioned with its periphery overlapping the adjacent ends of the receptacle and the conveyor means and means for driving said conveyor means and transfer means in proper relative timed relation.

HENRY CAVE.